(12) United States Patent
Goussard et al.

(10) Patent No.: US 10,388,278 B2
(45) Date of Patent: *Aug. 20, 2019

(54) STRUCTURED NATURAL LANGUAGE REPRESENTATIONS (71) Applicant: Nuance Communications, Inc., Burlington, MA (US)

(72) Inventors: Jacques-Olivier Goussard, Greenfield Park (CA); Richard Beaufort, Corbais (BE)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/430,658

(22) Filed: Feb. 13, 2017

(65) Prior Publication Data
US 2017/0154621 A1 Jun. 1, 2017

Related U.S. Application Data (63) Continuation of application No. 14/304,289, filed on Jun. 13, 2014, now Pat. No. 9,606,985.

(51) Int. Cl.
*G10L 15/18* (2013.01)
*G06F 16/332* (2019.01)
(Continued)

(52) U.S. Cl.
CPC .......... *G10L 15/18* (2013.01); *G06F 16/3329* (2019.01); *G06F 17/243* (2013.01);
(Continued)

(58) Field of Classification Search
USPC ....................... 704/8–10, 257, 235
See application file for complete search history.

(56) References Cited

U.S. PATENT DOCUMENTS 6,061,515 A      5/2000  Chang et al.
2007/0005369 A1  1/2007  Potter
(Continued)

FOREIGN PATENT DOCUMENTS

CN    101739852 A    6/2010
WO    02056196 A2    7/2002

OTHER PUBLICATIONS

Feb. 2, 2016—U.S. Non Final Office Action—U.S. Appl. No. 14/304,289.
(Continued)

*Primary Examiner* — Leonard Saint Cyr
(74) *Attorney, Agent, or Firm* — Brian J. Colandreo; Michael T. Abramson; Holland & Knight LLP (57) ABSTRACT In accordance with aspects of the disclosure, a computing device may identify a prompt associated with an automated dialog application. An application expectation of the automated dialog application may be identified. The application expectation may comprise a structured natural language representation for a natural language response to the prompt. The computing device may receive natural language input responsive to the prompt, populate one or more data fields of the structured natural language representation with at least a portion of the natural language input, and may respond to the application expectation using the one or more data fields of the structured natural language representation.

20 Claims, 5 Drawing Sheets (51) Int. Cl.
*G06F 17/24* (2006.01)
*G06F 17/27* (2006.01)
*G10L 15/22* (2006.01)

(52) U.S. Cl.
CPC ............ *G06F 17/279* (2013.01); *G10L 15/22* (2013.01); *G10L 2015/223* (2013.01)

(56) References Cited

U.S. PATENT DOCUMENTS

| | | |
|---|---|---|
| 2009/0055165 A1 | 2/2009 | Jindal et al. |
| 2009/0112604 A1 | 4/2009 | Scholz et al. |
| 2013/0275132 A1 | 10/2013 | Bangalore et al. |
| 2014/0101261 A1 | 4/2014 | Wu et al. |
| 2014/0101262 A1 | 4/2014 | Wu et al. |
| 2014/0101263 A1 | 4/2014 | Wu et al. |
| 2014/0126024 A1 | 5/2014 | Myers, III et al. |

OTHER PUBLICATIONS

Feb. 1, 2016—(WO) International Search Report and Written Opinion—App PCT/US2015/035516.
Jul. 26, 2016 U.S. Office Action—U.S. Appl. No. 14/304,289.
Sep. 4, 2018—(CN) First Office Action—App 201580031725.X, Eng Tran (machine).

STRUCTURED NATURAL LANGUAGE REPRESENTATIONS

CROSS-REFERENCE TO RELATED CASES

This application is a continuation of application Ser. No. 14/304,289, filed Jun. 13, 2014, having the title "Structured Natural Language Representations," herein incorporated by reference for all purposes.

TECHNICAL FIELD

This disclosure relates to natural language understanding. Specifically, this disclosure relates to computer systems that respond to application expectations of an automated dialog application using structured natural language representations.

BACKGROUND

Automated dialog systems are utilized to manipulate data based on natural language input (e.g., utterances spoken by a user). Such systems conventionally represent data in at least three ways: a natural language representation, representing the meaning of the natural language input (or spoken utterances); a data storage representation, representing the corresponding data in programmatic form; and a representation in the programming language, representing the data for utilization and manipulation by the underlying application(s). These representations are conventionally designed in isolation from one another, and thus logical gaps exist between them. One approach to bridging these gaps is to flatten the natural language representation (e.g., by mapping it out into key-value pair associations). For example, this approach is employed by the Voice Extensible Markup Language (VXML) standards. This flatting approach, however, leads to poor representations, placing the burden of reconstructing the information structure on the underlying application(s).

SUMMARY

The following presents a simplified summary in order to provide a basic understanding of some aspects of the disclosure. This summary is not an extensive overview of the disclosure. It is intended neither to identify key or critical elements of the disclosure nor to delineate the scope of the disclosure. The following summary merely presents some concepts of the disclosure in a simplified form as a prelude to the description below.

In accordance with one or more embodiments, a computing device may identify a prompt associated with an automated dialog application. An application expectation of the automated dialog application may be identified. The application expectation may comprise a structured natural language representation for a natural language response to the prompt. The computing device may receive natural language input responsive to the prompt, populate one or more data fields of the structured natural language representation with at least a portion of the natural language input, and may respond to the application expectation using the one or more data fields of the structured natural language representation.

In some embodiments, the structured natural language representation for the natural language input may comprise a scalar structured natural language representation. In such embodiments, the one or more data fields of the structured natural language representation may include at least one data field configured for a text string, and populating the one or more data fields of the structured natural language representation may include converting the at least a portion of the natural language input to an input text string, and populating the at least one data field configured for the text string with the input text string. Additionally or alternatively, the one or more data fields of the structured natural language representation may include at least one data field configured for a numerical value, and populating the one or more data fields of the structured natural language representation may include converting the at least a portion of the natural language input to an input numerical value, and populating the at least one data field configured for the numerical value with the input numerical value.

In some embodiments, the structured natural language representation for the natural language input may comprise a list structured natural language representation. The list structured natural language representation may comprise a plurality of structured natural language representations of a common type. In such embodiments, the at least a portion of the natural language input may include a first portion of natural language input corresponding to the common type and a second portion of natural language input corresponding to the common type. Populating the one or more data fields of the structured natural language representation may include populating one or more fields of a first structured natural language representation of the plurality of structured natural language representations of the common type with the first portion of natural language input, and populating one or more fields of the second structured natural language representation of the plurality of structured natural language representation of the common type with the second portion of natural language input.

In some embodiments, the one or more fields of the first structured natural language representation may be configured for a text string, and the one or more fields of the second structured natural language representation may also be configured for a text string. In such embodiments, populating the one or more fields of the first structured natural language representation may include converting the first portion of the natural language input to a first input text string, and populating the one or more fields of the first structured natural language representation with the first input text string, and populating the one or more fields of the second structured natural language representation may include converting the second portion of the natural language input to a second input text string, and populating the one or more fields of the second structured natural language representation with the second input text string. Additionally or alternatively, the one or more fields of the first structured natural language representation may be configured for a numerical value, and the one or more fields of the second structured natural language representation may be configured for a numerical value. In such embodiments, populating the one or more fields of the first structured natural language representation may include converting the first portion of the natural language input to a first input numerical value, and populating the one or more fields of the first structured natural language representation with the first input numerical value, and populating the one or more fields of the second structured natural language representation may include converting the second portion of the natural language input to a second input numerical value, and populating the one or more fields of the second structured natural language representation with the second input numerical value.

In some embodiments, the structured natural language representation for the natural language input may comprise a hierarchical structured natural language representation. The hierarchical structured natural language representation may comprise a plurality of different structured natural language representations and one or more attributes. The one or more attributes may interrelate the plurality of different structured natural language representations.

In some embodiments, at least one of the one or more attributes may indicate that a first of the plurality of different structured natural language representations is a subtype of a second of the plurality of different structured natural language representations. In such embodiments, the structured natural language representation for the natural language input may comprise the second of the plurality of different structured natural language representations, and populating the one or more data fields of the structured natural language representation may include populating one or more data fields of the first of the plurality of different structured natural language representations. In some embodiments, the one or more data fields of the first of the plurality of different structured natural language representations may be configured for a text string, and populating the one or more data fields of the first of the plurality of different structured natural language representations may include converting the at least a portion of the natural language input to an input text string, and populating the one or more data fields of the first of the plurality of different structured natural language representations with the input text string. Additionally or alternatively, the one or more data fields of the first of the plurality of different structured natural language representations may be configured for a numerical value, and populating the one or more data fields of the first of the plurality of different structured natural language representations may include converting the at least a portion of the natural language input to an input numerical value, and populating the one or more data fields of the first of the plurality of different structured natural language representations with the input numerical value.

In some embodiments, at least one of the one or more attributes may indicate that a first of the plurality of different structured natural language representations comprises a second of the plurality of different structured natural language representations. In such embodiments, the structured natural language representation for the natural language input may comprise the first of the plurality of different structured natural language representations, and populating the one or more data fields of the structured natural language representation may include populating one or more data fields of the second of the plurality of different structured natural language representations. In some embodiments, the one or more data fields of the second of the plurality of different structured natural language representations may be configured for a text string, and populating the one or more data fields of the second of the plurality of different structured natural language representations may include converting the at least a portion of the natural language input to an input text string, and populating the one or more data fields of the second of the plurality of different structured natural language representations with the input text string. Additionally or alternatively, the one or more data fields of the second of the plurality of different structured natural language representations may be configured for a numerical value, and populating the one or more data fields of the second of the plurality of different structured natural language representations may include converting the at least a portion of the natural language input to an input numerical value, and populating the one or more data fields of the second of the plurality of different structured natural language representations with the input numerical value.

In some embodiments, responding to the application expectation may include passing data stored in the one or more data fields of the structured natural language representation to the automated dialog application. Additionally or alternatively, responding to the application expectation may include altering a database table utilized by the automated dialog application to reflect data stored in the one or more data fields of the structured natural language representation.

Other details and features will be described in the sections that follow.

BRIEF DESCRIPTION OF THE DRAWINGS

The present disclosure is pointed out with particularity in the appended claims. Features of the disclosure will become more apparent upon a review of this disclosure in its entirety, including the drawing figures provided herewith.

Some features herein are illustrated by way of example, and not by way of limitation, in the figures of the accompanying drawings, in which like reference numerals refer to similar elements, and wherein.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

Figure 1:
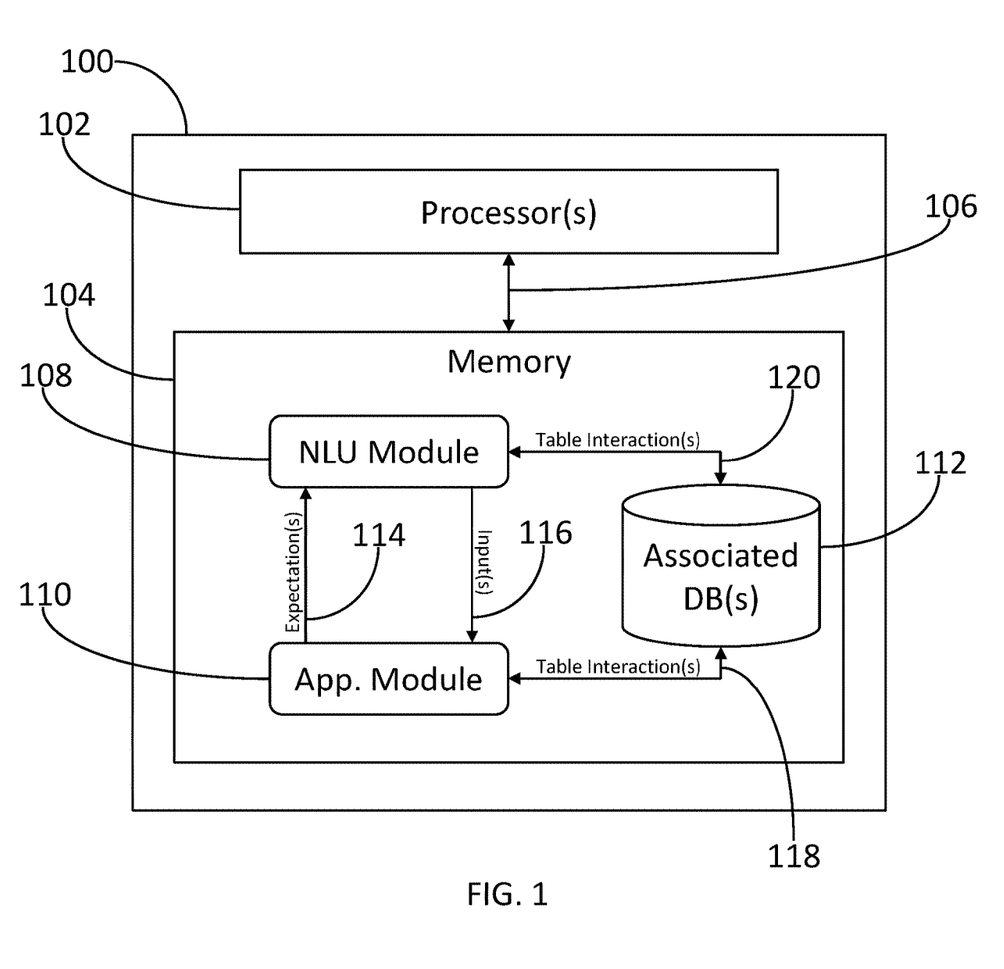
FIG. 1 depicts an illustrative computing device for responding to application expectations of an automated dialog application using structured natural language representations in accordance with one or more example embodiments.

FIG. 1 depicts an illustrative computing device for responding to application expectations of an automated dialog application using structured natural language representations in accordance with one or more example embodiments. Referring to FIG. 1, computing device 100 may be any type of computing device (or combination thereof) capable of performing the functions described herein. For example, computing device 100 may be a server, server blade, desktop computer, laptop computer, tablet computer, smart phone, mobile device, or the like. Computing device 100 may include processor(s) 102 and memory 104. Data bus 106 may interconnect processor(s) 102 and memory 104, and may support intercommunication between processor(s) 102 and memory 104. Memory 104 may include one or more program modules comprising executable instructions that when executed by processor(s) 102 cause (or configure) computing device 100 to perform one or more functions described herein. For example, memory 104 may include NLU module 108 and automated dialog application module 110. NLU module 108 may include executable instructions associated with disassembling and/or parsing natural language input (e.g., utterances spoken by a user of computing device 100), and communicating data representative of the natural language input (or portions thereof) to automated dialog application module 110. Automated dialog application module 110 may include instructions associated with one or more supported automated dialog applications that generate prompts (e.g., audio prompts), process responses to the prompts (e.g., data received from NLU module 108 representative of responses), and/or manipulate data (e.g., underlying application data) based on the responses. In some embodiments, memory 104 may also include associated database(s) 112. Associated database(s) 112 may include one or more data structures (e.g., tables) storing information associated with automated dialog application module 110 (or one or more applications associated therewith).

Automated dialog application module 110 may identify a prompt associated with a supported automated dialog application. The prompt may be associated with application expectation(s) 114 comprising a structured natural language representation for a natural language response to the prompt. Automated dialog application module 110 may identify expectation(s) 114 and may communicate expectation(s) 114 to NLU module 108. NLU module 108 may receive natural language input responsive to the prompt of the automated dialog application (e.g., utterance(s) spoken by a user of computing device 100), and may populate one or more data fields of the structured natural language representation with the natural language input (or a portion thereof). NLU module 108 may utilize data from the populated data field(s) of the structured natural language representation to generate input(s) 116 responsive to the application expectation(s) 114, which may be communicated to automated dialog application module 110, for example, by passing data stored in the data field(s) of the structured natural language representation to the supported automated dialog application associated with automated dialog application module 110 (e.g., via a return to a function call, method call, or the like). In some embodiments, automated dialog application module 110 may alter data structure(s) stored in associated database(s) 112 based on input(s) 116 (e.g., by performing table interaction(s) 118). Additionally or alternatively, NLU module 108 may alter data structure(s) stored in associated database(s) 112 to reflect data from the populated data field(s) of the structured natural language representation (e.g., in lieu of generating and/or communicating input(s) 116).

Figure 2:
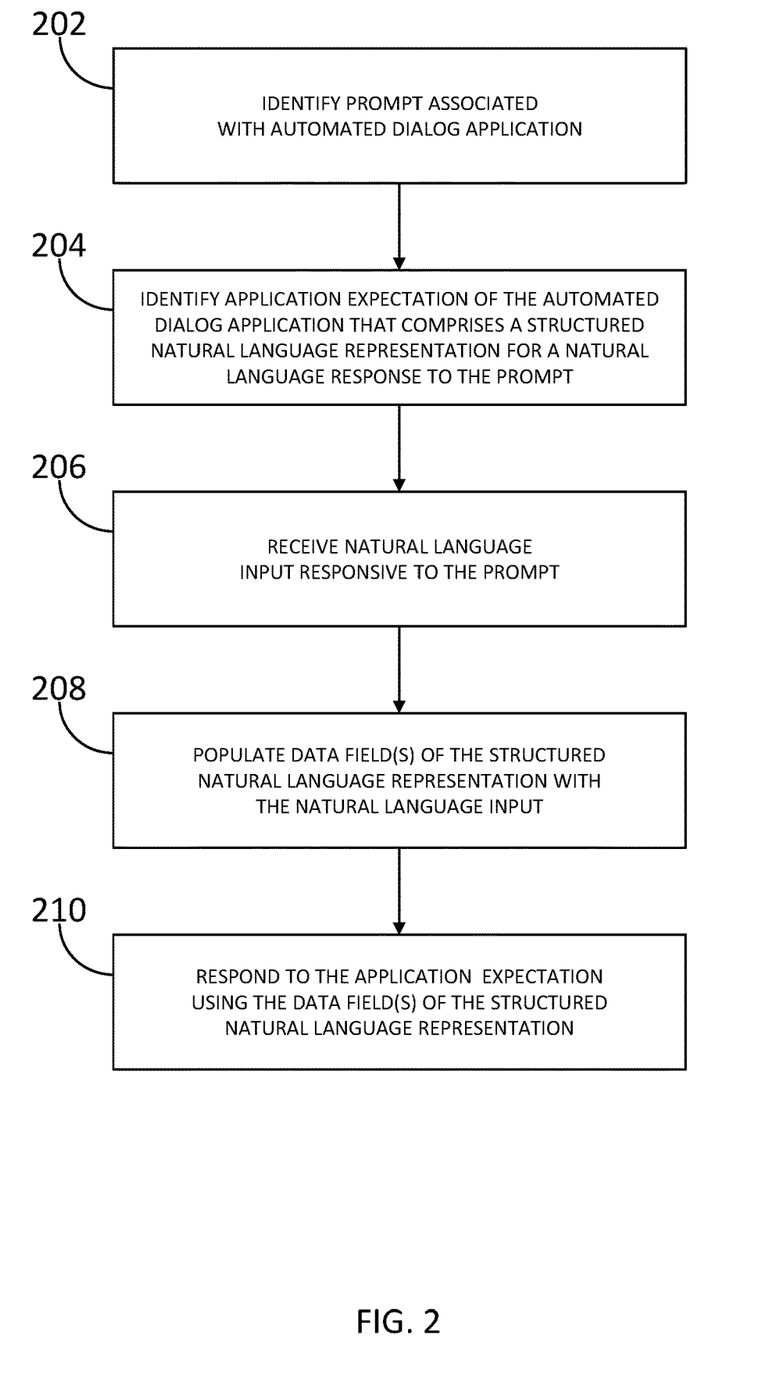
FIG. 2 depicts an illustrative method for responding to an application expectation of an automated dialog application using a structured natural language representation in accordance with one or more example embodiments.

FIG. 2 depicts an illustrative method for responding to an application expectation of an automated dialog application using a structured natural language representation in accordance with one or more example embodiments. Referring to FIG. 2, at step 202, a prompt associated with an automated dialog application may be identified. For example, automated dialog application module 110 may support an automated dialog application (e.g., a travel planning application), and automated dialog application module 110 may identify a prompt associated with the supported automated dialog application (e.g., "Where do you want to travel to?" or "When do you want to leave?"). At step 204, an application expectation of the automated dialog application may be identified. For example, automated dialog application module 110 may identify application expectation(s) 114 (e.g., DESTINATION or DEPARTURE_TIME) of the supported automated dialog application. Application expectation(s) 114 may comprise a structured natural language representation for a natural language input responsive to the prompt (e.g., a predefined structure comprising a representation of one or more natural language input responses that are anticipated to be received responsive to the prompt). For example, application expectation(s) 114 may comprise a structured natural language representation for one or more natural language inputs responsive to the identified prompt (e.g., DESTINATION{CITY, AIRPORT, LOCATION} or DEPARTURE_TIME {DAY, TIME}). In some embodiments, the structured natural language representation for the natural language input may comprise a scalar structured natural language representation. For example, the structured natural language representation for the natural language input may comprise one or more data fields configured for a text string and/or one or more data fields configured for a numerical value (e.g., an integer value, floating point value, or the like).

At step 206, natural language input (e.g., data representative of one or more utterances spoken by a user of computing device 100) may be received. For example, NLU module 108 may receive natural language input responsive to the prompt (e.g., data representative of one or more spoken utterances comprising "New York City," "Kennedy," "Today," "Tomorrow," "Monday," "May 10th," "Ten," "Ten o-clock at night," "Noon," or the like). At step 208, NLU module 108 may populate one or more data fields of the structured natural language representation with at least a portion of the natural language input. For example, as indicated above, the structured natural language representation may comprise data field(s) configured for text string(s) and/or numerical value(s), and NLU module 108 may convert a portion of the natural language input (e.g., the data representative of the one or more spoken utterances comprising "New York City," "Kennedy," "Today," "Tomorrow," "Monday," "May 10th," "Ten," "Ten o-clock at night," "Noon," or the like) into input value(s) for the data field(s) (e.g., "New York City, NY" "JFK," "05-01-2014," "05-02-2014," "05-05-2014," "05-10-2014," "10:00," "22:00," "12:00," or the like), and may populate the data field(s) with the input value(s). At step 210, NLU module 108 may respond to application expectation(s) 114 using the data field(s) of the structured natural language representation. For example, NLU module 108 may extract information from the data field(s) (e.g., "New York City, NY" "JFK," "05-01-2014," "05-02-2014," "05-05-2014," "05-10-2014," "10:00," "22:00," "12:00," or the like) and generate input(s) 116, which may be communicated to automated dialog application module 110. Additionally or alternatively, NLU module 108 may extract information from the data field(s) (e.g., "New York City, NY" "JFK," "05-01-2014," "05-02-2014," "05-05-2014," "05-10-2014," "10:00," "22:00," "12:00," or the like) and perform table interaction(s) 120 using (or based on) the information extracted from the data field(s).

Figure 3:
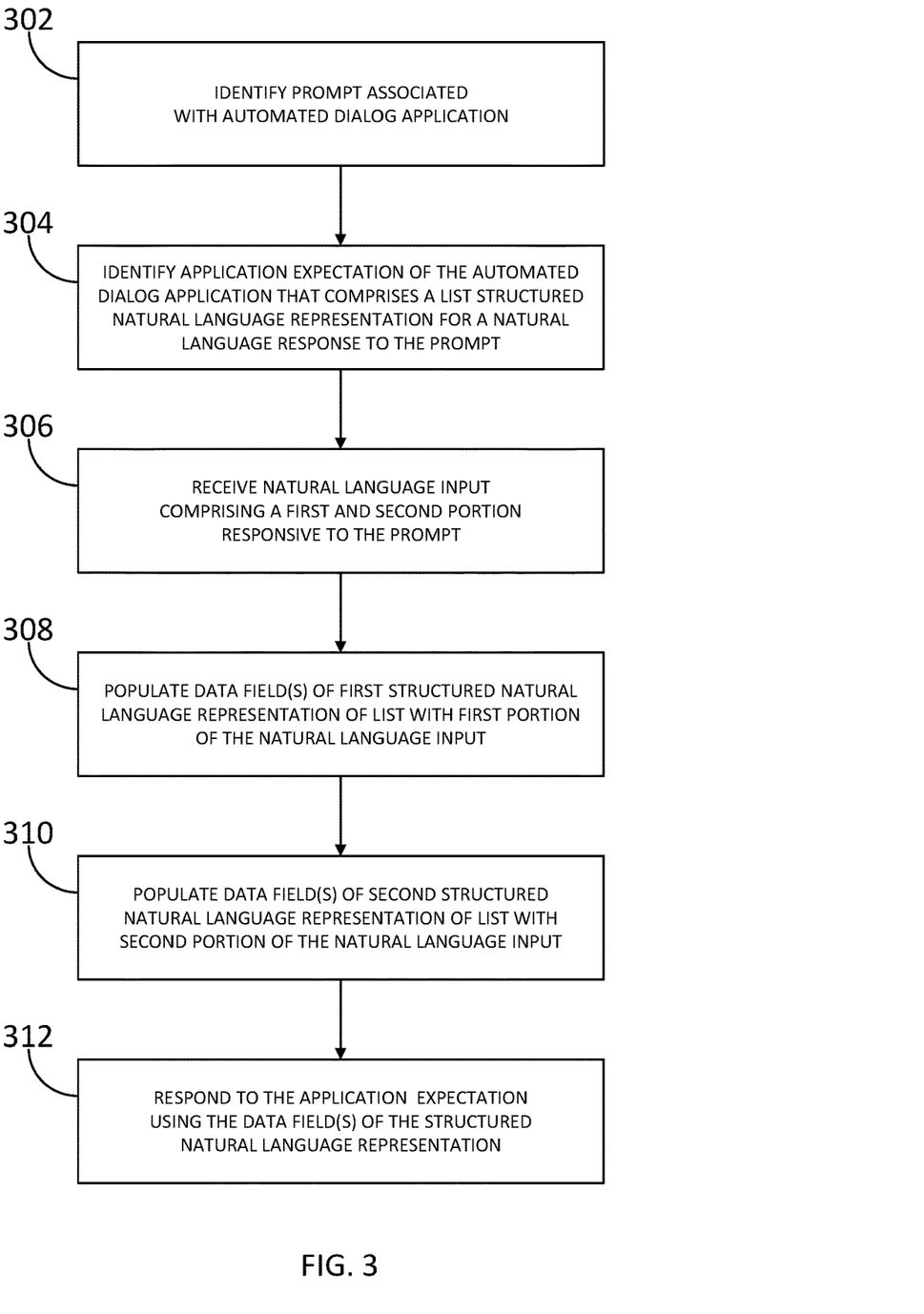
FIG. 3 depicts an illustrative method for responding to an application expectation of an automated dialog application using a list structured natural language representation in accordance with one or more example embodiments.

FIG. 3 depicts an illustrative method for responding to an application expectation of an automated dialog application using a list structured natural language representation in accordance with one or more example embodiments. Referring to FIG. 3, at step 302, a prompt associated with an automated dialog application may be identified. For example, automated dialog application module 110 may support an automated dialog application (e.g., a movie database application), and automated dialog application module 110 may identify a prompt associated with the supported automated dialog application (e.g., "Who starred in the movie you are trying to identify?"). At step 304, an application expectation of the automated dialog application may be identified. For example, automated dialog application module 110 may identify application expectation(s) 114 (e.g., ACTORS) of the supported automated dialog application. Application expectation(s) 114 may comprise a structured natural language representation for a natural language input responsive to the prompt (e.g., a predefined structure comprising a representation of one or more natural language input responses that are anticipated to be received responsive to the prompt).

In some embodiments, the structured natural language representation may comprise a list structured natural language representation comprising a plurality of structured natural language representations of a common type (e.g., ACTORS{ACTOR-1, ACTOR-2, . . . ACTOR-N}), each of which may comprise one or more data fields configured for a text string (e.g., FIRST_NAME, LAST_NAME, or the like) and/or one or more data fields configured for a numerical value (e.g., an integer value, floating point value, or the like). At step 306, natural language input (e.g., data representative of one or more utterances spoken by a user of computing device 100) may be received. For example, NLU module 108 may receive natural language input responsive to the prompt (e.g., data representative of one or more spoken utterances comprising "Meryl," "Streep," "and," "Tom," "Hanks," or the like). The natural language input may comprise one or more portions each of which correspond to the common type. For example, the natural language input may comprise a first portion (e.g., the data representative of the one or more spoken utterances comprising "Meryl" and "Streep") corresponding to the common type (e.g., ACTOR) and a second portion (e.g., the data representative of the one or more spoken utterances comprising "Tom" and "Hanks") corresponding to the common type (e.g., ACTOR).

At step 308, NLU module 108 may populate one or more data fields (e.g., FIRST_NAME and LAST_NAME) of the first structured natural language representation of the list structured natural language representation with the first portion of the natural language input, for example, by converting the first portion of the natural language input (e.g., the data representative of the one or more spoken utterances comprising "Meryl" and "Streep") into input value(s) (e.g., "Meryl" and "Streep") and populating the data field(s) (e.g., FIRST_NAME and LAST_NAME) of the first structured natural language representation of the list structured natural language representation with the input value(s). At step 310, NLU module 108 may populate one or more data fields (e.g., FIRST_NAME and LAST_NAME) of the second structured natural language representation of the list structured natural language representation with the second portion of the natural language input, for example, by converting the second portion of the natural language input (e.g., the data representative of the one or more spoken utterances comprising "Tom" and "Hanks") into input value(s) (e.g., "Tom" and "Hanks") and populating the data field(s) (e.g., FIRST_NAME and LAST_NAME) of the second structured natural language representation of the list structured natural language representation with the input value(s).

At step 312, NLU module 108 may respond to application expectation(s) 114 using the data field(s) of the list structured natural language representation. For example, NLU module 108 may extract information from the data field(s) of the first structured natural language representation of the list structured natural language representation (e.g., "Meryl" and/or "Streep") and/or from the data field(s) of the second structured natural language representation of the list structured natural language representation (e.g., "Tom" and/or "Hanks") and generate input(s) 116, which may be communicated to automated dialog application module 110. Additionally or alternatively, NLU module 108 may extract information from the data field(s) of the first structured natural language representation of the list structured natural language representation (e.g., "Meryl" and/or "Streep") and/or from the data field(s) of the second structured natural language representation of the list structured natural language representation (e.g., "Tom" and/or "Hanks") and perform table interaction(s) 120 using (or based on) the information extracted from the data field(s).

Figure 4:
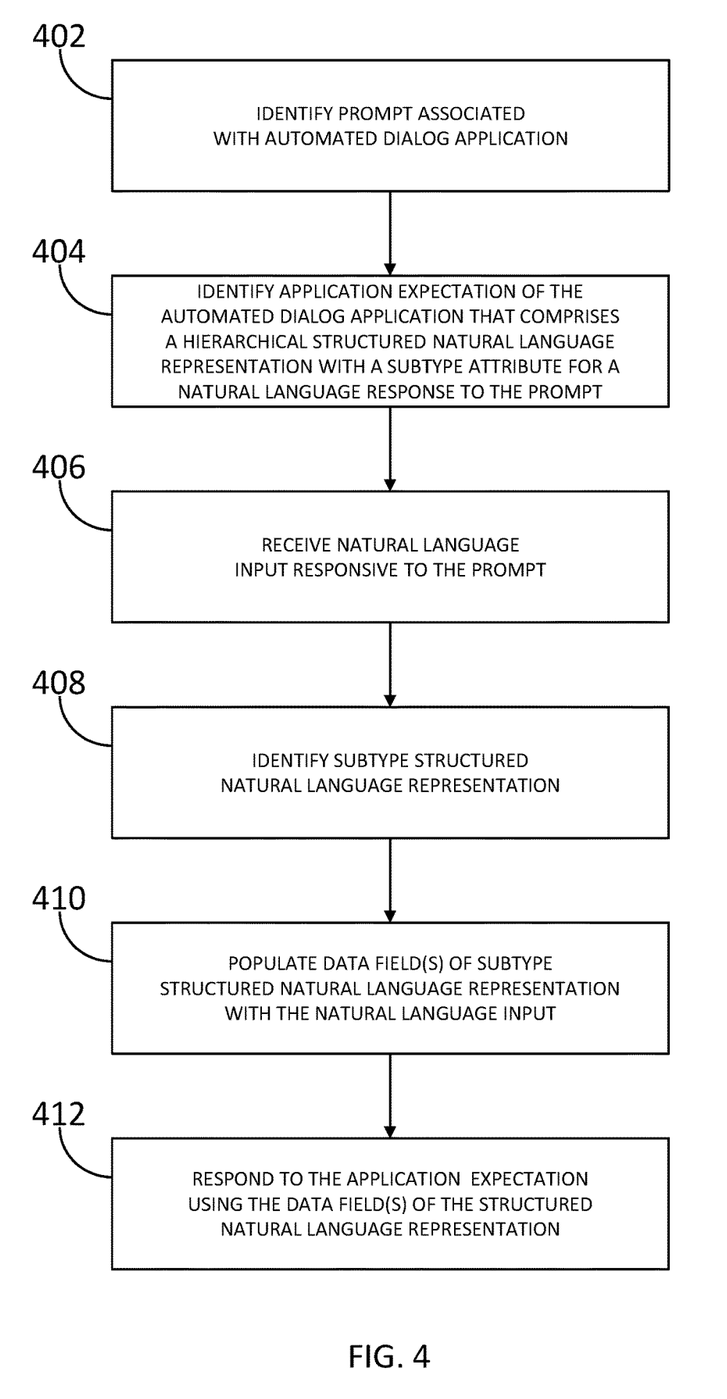
FIG. 4 depicts an illustrative method for responding to an application expectation of an automated dialog application using a hierarchical structured natural language representation with a subtype attribute in accordance with one or more example embodiments.

FIG. 4 depicts an illustrative method for responding to an application expectation of an automated dialog application using a hierarchical structured natural language representation with a subtype attribute in accordance with one or more example embodiments. Referring to FIG. 4, at step 402, a prompt associated with an automated dialog application may be identified. For example, automated dialog application module 110 may support an automated dialog application (e.g., a movie database application), and automated dialog application module 110 may identify a prompt associated with the supported automated dialog application (e.g., "Who is your favorite movie star?"). At step 404, an application expectation of the automated dialog application may be identified. For example, automated dialog application module 110 may identify application expectation(s) 114 (e.g., ACTOR) of the supported automated dialog application. Application expectation(s) 114 may comprise a structured natural language representation for a natural language input responsive to the prompt (e.g., a predefined structure comprising a representation of one or more natural language input responses that are anticipated to be received responsive to the prompt).

In some embodiments, the structured natural language representation may comprise a hierarchical structured natural language representation comprising a plurality of different structured natural language representations and one or more attributes that interrelate the plurality of different structured natural language representations. For example, the structured natural language representation may comprise a hierarchical structured natural language representation (e.g., ACTOR{is-A PERSON}) comprising a plurality of different structured natural language representations (e.g., ACTOR and PERSON) and one or more attributes (e.g., "is-A") that indicates that a first of the structured natural language representations (e.g., ACTOR) is a subtype of a second of the structured natural language representations (e.g., PERSON). One or more of the structured natural language representations may comprise one or more data fields configured for a text string (e.g., FIRST_NAME, LAST_NAME, or the like) and/or one or more data fields configured for a numerical value (e.g., an integer value, floating point value, or the like). At step 406, natural language input (e.g., data representative of one or more utterances spoken by a user of computing device 100) may be received. For example, NLU module 108 may receive natural language input responsive to the prompt (e.g., data representative of one or more spoken utterances comprising "Meryl Streep," or the like). At step 408, NLU module 108 may identify (e.g., based on the hierarchical structured natural language representation) the subtype structured natural language representation (e.g., PERSON).

At step 410, NLU module 108 may populate one or more data fields (e.g., FIRST_NAME and LAST_NAME) of the subtype structured natural language representation (e.g., PERSON) of the hierarchical structured natural language representation (e.g., ACTOR{s-A PERSON}) with the natural language input (or a portion thereof), for example, by converting the natural language input (e.g., the data representative of the one or more spoken utterances comprising "Meryl Streep") into input value(s) (e.g., "Meryl" and "Streep") and populating the data field(s) (e.g., FIRST_NAME and LAST_NAME) of the subtype structured natural language representation (e.g., PERSON) of the hierarchical structured natural language representation (e.g., ACTOR{s-A PERSON}) with the input value(s). At step 412, NLU module 108 may respond to application expectation(s) 114 using the data field(s) of the hierarchical structured natural language representation (e.g., the populated data field(s) of the subtype structured natural language representation). For example, NLU module 108 may extract information from the data field(s) of the subtype structured natural language representation of the hierarchical structured natural language representation (e.g., "Meryl" and/or "Streep") and generate input(s) 116, which may be communicated to automated dialog application module 110. Additionally or alternatively, NLU module 108 may extract information from the data field(s) of the subtype structured natural language representation of the hierarchical structured natural language representation (e.g., "Meryl" and/or "Streep") and perform table interaction(s) 120 using (or based on) the information extracted from the data field(s).

Figure 5:
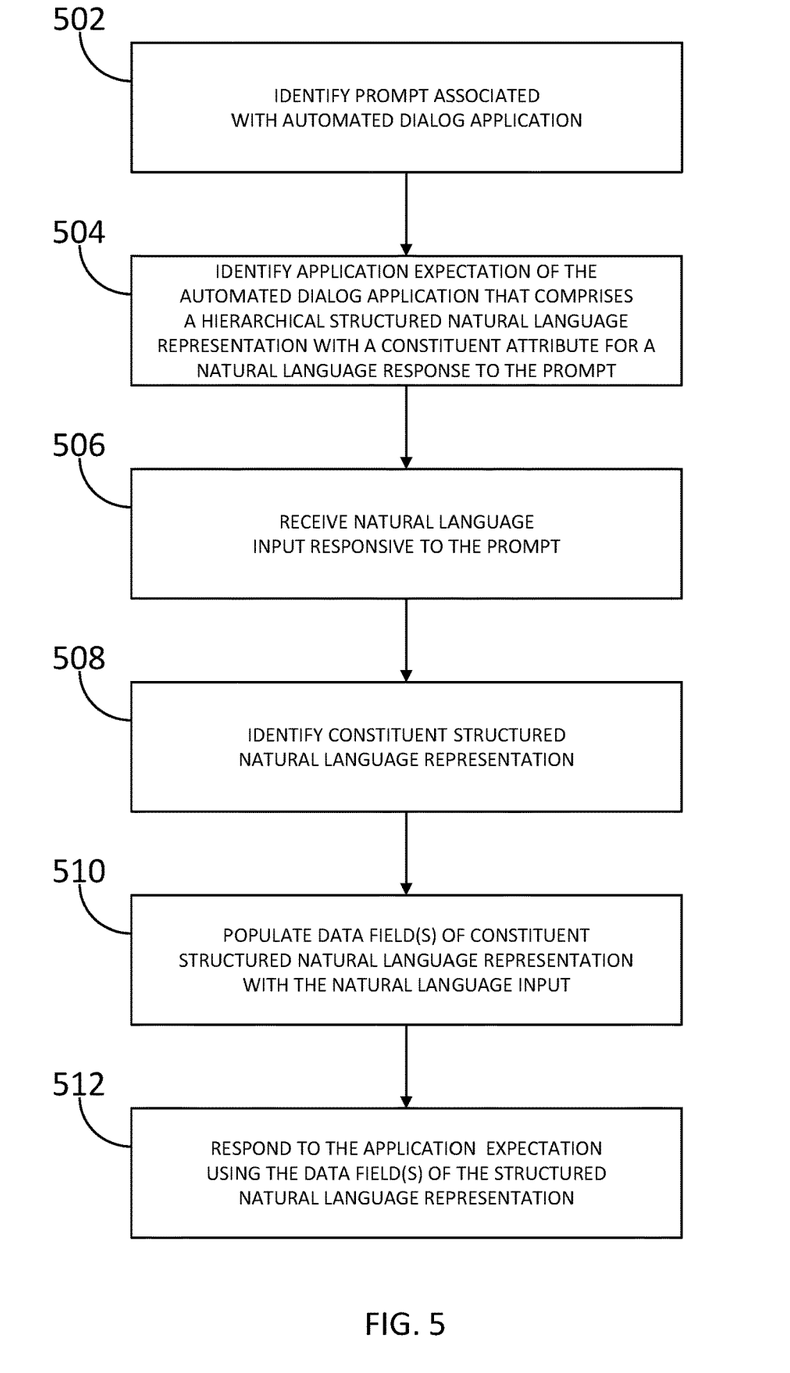
FIG. 5 depicts an illustrative method for responding to an application expectation of an automated dialog application using a hierarchical structured natural language representation with a constituent attribute in accordance with one or more example embodiments.

FIG. 5 depicts an illustrative method for responding to an application expectation of an automated dialog application using a hierarchical structured natural language representation with a constituent attribute in accordance with one or more example embodiments. Referring to FIG. 5, at step 502, a prompt associated with an automated dialog application may be identified. For example, automated dialog application module 110 may support an automated dialog application (e.g., a contact-management application), and automated dialog application module 110 may identify a prompt associated with the supported automated dialog application (e.g., "Who do you want to call?"). At step 504, an application expectation of the automated dialog application may be identified. For example, automated dialog application module 110 may identify application expectation(s) 114 (e.g., CONTACT) of the supported automated dialog application. Application expectation(s) 114 may comprise a structured natural language representation for a natural language input responsive to the prompt (e.g., a predefined structure comprising a representation of one or more natural language input responses that are anticipated to be received responsive to the prompt).

In some embodiments, the structured natural language representation may comprise a hierarchical structured natural language representation comprising a plurality of different structured natural language representations and one or more attributes that interrelate the plurality of different structured natural language representations. For example, the structured natural language representation may comprise a hierarchical structured natural language representation (e.g., CONTACT{has-A NAME, RELATION}) comprising a plurality of different structured natural language representations (e.g., CONTACT, NAME, and RELATION) and one or more attributes (e.g., "has-A") that indicates that a first of the structured natural language representations (e.g., CONTACT) comprises one or more constituent structured natural language representations (e.g., NAME and RELATION). One or more of the structured natural language representations may comprise one or more data fields configured for a text string (e.g., FIRST_NAME, LAST_NAME, NICKNAME, RELATIONSHIP_TYPE, or the like) and/or one or more data fields configured for a numerical value (e.g., an integer value, floating point value, or the like). At step 506, natural language input (e.g., data representative of one or more utterances spoken by a user of computing device 100) may be received. For example, NLU module 108 may receive natural language input responsive to the prompt (e.g., data representative of one or more spoken utterances comprising "My brother," or the like). At step 508, NLU module 108 may identify (e.g., based on the hierarchical structured natural language representation) the constituent structured natural language representation (e.g., RELATION).

At step 510, NLU module 108 may populate one or more data fields (e.g., RELATIONSHIP_TYPE) of the constituent structured natural language representation (e.g., RELATION) of the hierarchical structured natural language representation (e.g., CONTACT) with the natural language input (or a portion thereof), for example, by converting the natural language input (e.g., the data representative of the one or more spoken utterances comprising "My brother") into input value(s) (e.g., "Brother") and populating the data field(s) (e.g., RELATIONSHIP_TYPE) of the constituent structured natural language representation (e.g., RELATION) of the hierarchical structured natural language representation (e.g., CONTACT) with the input value(s). At step 512, NLU module 108 may respond to application expectation(s) 114 using the data field(s) of the hierarchical structured natural language representation (e.g., the populated data field(s) of the constituent structured natural language representation). For example, NLU module 108 may extract information from the data field(s) of the constituent structured natural language representation of the hierarchical structured natural language representation (e.g., "Brother") and generate input(s) 116, which may be communicated to automated dialog application module 110. Additionally or alternatively, NLU module 108 may extract information from the data field(s) of the constituent structured natural language representation of the hierarchical structured natural language representation (e.g., "Brother") and perform table interaction(s) 120 using (or based on) the information extracted from the data field(s).

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing servers and one or more networks. The functionality may be distributed in any manner, or may be located in a single computing device (e.g., a server, a client computer, and the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
   identifying a prompt for a spoken natural language response by a user, wherein the prompt is associated with an application;
   identifying an expectation of the application, wherein the expectation indicates a data type associated with an expected spoken natural language response to the prompt;
   receiving, responsive to the prompt, natural language input that is based on one or more utterances by the user;
   disassembling, by one or more computing devices, the natural language input into a first portion based upon, at least in part, the first portion of the natural language input corresponding to a first occurrence of the data type within the natural language input and a second portion based upon, at least in part, the second portion of the natural language input corresponding to a second occurrence of the data type within the natural language input;
   transforming, by the one or more computing devices, the first portion of the natural language input to one or more first values;
   transforming, by the one or more computing devices, the second portion of the natural language input to one or more second values;
   populating, based on the expectation, a structured natural language representation by populating one or more first data fields of the structured natural language representation with the one or more first values and by populating one or more second data fields of the structured natural language representation with the one or more second values; and
   providing, based on the structured natural language representation, response data to the application, wherein the response data indicates the one or more first values and the one or more second values in a predefined structure of the structured natural language representation that the application anticipates in response to the prompt.

2. The method of claim 1, wherein the one or more first values comprise
   a first text string and wherein the one or more second values comprise a second text string.

3. The method of claim 1, wherein the one or more first values comprise
   a first numerical value, and wherein the one or more second values comprise a second numerical value.

4. The method of claim 1, wherein the structured natural language representation comprises a list of data fields corresponding to occurrences of the data type in the expected spoken natural language response.

5. The method of claim 1, wherein the structured natural language representation comprises a plurality of natural language representations and one or more attributes that interrelate the plurality of natural language representations to form a hierarchy.

6. The method of claim 5, wherein the data type corresponds to a first natural language representation from the plurality of natural language representations, and wherein a first attribute of the one or more attributes indicates that a second natural language representation from the plurality of natural language representations is a subtype of the first natural language representation.

7. The method of claim 6, wherein a second attribute of the one or more attributes indicates that the first natural language representation comprises the one or more first data fields and the one or more second data fields.

8. The method of claim 1, wherein providing the response data to the application comprises altering a database table to indicate the one or more first values and the one or more second values, and wherein the database table is accessible to the application.

9. A method comprising:
   receiving, from an application that generated a prompt for a spoken natural language response by a user, a structured natural language representation associated with the prompt that indicates a data type associated with an expected spoken natural language response to the prompt, wherein the structured natural language representation comprises one or more first data fields corresponding to a first occurrence of a data type within the expected spoken natural language response and one or more second data fields corresponding to a second occurrence of the data type within the expected spoken natural language response;
   receiving, responsive to the prompt, natural language input that is based on one or more utterances by the user;

disassembling, by one or more computing devices, the natural language input into a first portion based upon, at least in part, the first portion of the natural language input corresponding to a first occurrence of the data type within the natural language input and a second portion based upon, at least in part, the second portion of the natural language input corresponding to a second occurrence of the data type within the natural language input;

transforming, by the one or more computing devices, the first portion of the natural language input to one or more first values;

transforming, by the one or more computing devices, the second portion of the natural language input to one or more second values;

populating the first one or more data fields with the one or more first values;

populating the second one or more data fields with the one or more second values; and providing, based on the one or more first data fields and the one or more second data fields, response data to the application, wherein the response data indicates the one or more first values and the one or more second values in a predefined structure of the structured natural language representation that the application anticipates in response to the prompt.

10. The method of claim 9, wherein the one or more first values comprise a first text string and wherein the one or more second values comprise a second text string.

11. The method of claim 9, wherein the one or more first values comprise a first numerical value, and wherein the one or more second values comprise a second numerical value.

12. The method of claim 9, wherein the structured natural language representation comprises a list of data fields corresponding to the data type.

13. The method of claim 9, wherein the structured natural language representation comprises a plurality of natural language representations and one or more attributes that interrelate the plurality of natural language representations to form a hierarchy.

14. The method of claim 13, wherein the data type corresponds to a first natural language representation from the plurality of natural language representations, and wherein a first attribute of the one or more attributes indicates that a second natural language representation from the plurality of natural language representations is a subtype of the first natural language representation.

15. The method of claim 14, wherein a second attribute of the one or more attributes indicates that the first natural language representation comprises the one or more first data fields and the one or more second data fields.

16. The method of claim 9, wherein providing the response data to the application comprises altering a database table indicate the one or more first values and the one or more second values, wherein the database table is accessible to the application.

17. The method of claim 9, wherein providing the response data to the application comprises transmitting, to the application, the response data.

18. One or more non-transitory computer readable media storing executable instructions that, when executed, cause an apparatus to:

receive, from an application that that generated a prompt for a spoken natural language response by a user, a structured natural language representation associated with the prompt that indicates a data type associated with an expected spoken natural language response to the prompt, wherein the structured natural language representation comprises one or more first data fields corresponding to a first occurrence of a data type within the expected spoken natural language response and one or more second data fields corresponding to a second occurrence of the data type within the expected spoken natural language response;

receive, responsive to the prompt, natural language input that is based on one or more utterances by a user;

disassemble the natural language input into a first portion based upon, at least in part, the first portion of the natural language input corresponding to a first occurrence of the data type within the natural language input and a second portion based upon, at least in part, the second portion of the natural language input corresponding to a second occurrence of the data type within the natural language input;

transform the first portion of the natural language input to one or more first values;

transform the second portion of the natural language input to one or more second values;

populate the one or more first data fields with the one or more first values;

populate the one or more second data fields with the one or more second values; and provide, based on the structured natural language representation, response data to the application, wherein the response data indicates the one or more first values and the one or more second values in a predefined structure of the structured natural language representation that the application anticipates in response to the prompt.

19. The one or more non-transitory computer readable media of claim 18, wherein causing the apparatus to provide the response data to the application comprises causing the apparatus to alter a database table to indicate the one or more first values and the one or more second values, wherein the database table is accessible to the application.

20. The one or more non-transitory computer readable media of claim 18, wherein causing the apparatus to provide the response data to the application comprises causing the apparatus to transmit, to the application, the response data.

* * * * *